(12) United States Patent
Subramaniam

(10) Patent No.: US 8,635,305 B1
(45) Date of Patent: Jan. 21, 2014

(54) MECHANISMS FOR PROVIDING DIFFERENTIATED SERVICES WITHIN A WEB CACHE

(75) Inventor: Sundarajan Subramaniam, San Jose, CA (US)

(73) Assignee: Cisco Technology, Inc.

( * ) Notice: Subject to any disclaimer, the term of this patent is extended or adjusted under 35 U.S.C. 154(b) by 2558 days.

(21) Appl. No.: 10/034,157

(22) Filed: Dec. 19, 2001

(51) Int. Cl.
*G06F 15/16* (2006.01)

(52) U.S. Cl.
USPC .......................................................... 709/219

(58) Field of Classification Search
USPC .................. 709/219, 239; 711/E12.004, 138
See application file for complete search history.

(56) References Cited

U.S. PATENT DOCUMENTS

| | | | |
|---|---|---|---|
| 5,414,704 A | 5/1995 | Spinney | |
| 5,488,412 A | 1/1996 | Majeti et al. | |
| 5,506,987 A | 4/1996 | Abramson et al. | |
| 5,586,121 A | 12/1996 | Moura et al. | |
| RE35,774 E | 4/1998 | Moura et al. | |
| 5,818,845 A | 10/1998 | Moura et al. | |
| 5,828,655 A | 10/1998 | Moura et al. | |
| 5,859,852 A | 1/1999 | Moura et al. | |
| 5,872,773 A | 2/1999 | Katzela et al. | |
| 5,892,903 A | 4/1999 | Klaus | |
| 5,946,047 A | 8/1999 | Levan | |
| 5,946,048 A | 8/1999 | Levan | |
| 5,950,205 A | 9/1999 | Aviani, Jr. | |
| 5,953,335 A | 9/1999 | Erimli et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,989,060 A | 11/1999 | Coile et al. | |
| 6,006,264 A * | 12/1999 | Colby et al. | 709/226 |
| 6,006,266 A | 12/1999 | Murphy et al. | |
| 6,016,388 A | 1/2000 | Dillon | |
| 6,052,718 A | 4/2000 | Gifford | |
| 6,240,461 B1 * | 5/2001 | Cieslak et al. | 709/235 |
| 6,308,216 B1 * | 10/2001 | Goldszmidt et al. | 709/236 |
| 6,345,294 B1 | 2/2002 | O'Toole et al. | |
| 6,542,964 B1 * | 4/2003 | Scharber | 711/122 |
| 6,678,793 B1 * | 1/2004 | Doyle | 711/133 |
| 6,701,316 B1 * | 3/2004 | Li et al. | 707/10 |
| 6,728,836 B1 * | 4/2004 | Lambright et al. | 711/129 |

(Continued)

OTHER PUBLICATIONS

Eager et al., "Adaptive Load Sharing in Homogeneous Distributed Systems," IEEE, Transactions on Software Engineering, vol. Se-12, No. 5, May 1986, pp. 662-675.

(Continued)

*Primary Examiner* — Jerry Dennison

(57) ABSTRACT

Methods and apparatus for providing differentiated services with respect to data processing provided by a cache engine. Requests that are received into a cache engine are associated with a particular service level. Processing of the request by the cache engine is then based on the request's particular service level, and may be prioritized based on the request's particular service level, or may be based on the number of hits for such object by clients having the particular service level. When the cache engine does not contain the requested object, the request may be forwarded to a selected origin server, based on the service level of the request. When a response is received from an origin server into the cache engine, processing of such response may also be based on the object request's service level, as well as a priority of the object of the response.

21 Claims, 6 Drawing Sheets

(56) References Cited

U.S. PATENT DOCUMENTS

| | | | |
|---|---|---|---|
| 6,748,447 B1* | 6/2004 | Basani et al. | 709/244 |
| 6,772,199 B1* | 8/2004 | Keller et al. | 709/213 |
| 6,772,288 B1* | 8/2004 | Flake et al. | 711/118 |
| 6,822,961 B1* | 11/2004 | Constantinof et al. | 370/395.2 |
| 6,883,068 B2* | 4/2005 | Tsirigotis et al. | 711/133 |
| 6,973,536 B1* | 12/2005 | Jacobs et al. | 711/119 |
| 6,976,090 B2* | 12/2005 | Ben-Shaul et al. | 709/246 |
| 6,985,936 B2* | 1/2006 | Agarwalla et al. | 709/221 |
| 7,003,572 B1* | 2/2006 | Lownsbrough et al. | 709/227 |
| 7,016,956 B2* | 3/2006 | Dobbins et al. | 709/224 |
| 7,062,570 B2* | 6/2006 | Hong et al. | 709/238 |
| 7,065,573 B2* | 6/2006 | Byrnes | 709/224 |
| 7,103,645 B2* | 9/2006 | Leighton et al. | 709/219 |
| 7,103,794 B2* | 9/2006 | Malcolm et al. | 714/4 |
| 7,146,430 B2* | 12/2006 | Kobayashi | 709/238 |
| 7,185,063 B1* | 2/2007 | Kasriel et al. | 709/216 |
| 7,237,027 B1* | 6/2007 | Raccah et al. | 709/226 |
| 7,237,093 B1* | 6/2007 | Musoll et al. | 712/205 |
| 7,269,608 B2* | 9/2007 | Wong et al. | 707/201 |
| 7,330,908 B2* | 2/2008 | Jungck | 709/246 |
| 7,339,937 B2* | 3/2008 | Mitra et al. | 370/395.53 |
| 7,346,676 B1* | 3/2008 | Swildens et al. | 709/223 |
| 7,346,702 B2* | 3/2008 | Haviv | 709/238 |
| 7,403,935 B2* | 7/2008 | Horvitz et al. | 707/1 |
| 2002/0049840 A1 | 4/2002 | Squire et al. | 709/225 |
| 2002/0069279 A1 | 6/2002 | Romero et al. | 709/225 |
| 2002/0087694 A1* | 7/2002 | Daoud et al. | 709/226 |
| 2002/0087707 A1 | 7/2002 | Stewart et al. | 709/230 |
| 2002/0120741 A1 | 8/2002 | Webb et al. | 709/225 |
| 2002/0143981 A1* | 10/2002 | DeLima et al. | 709/233 |
| 2002/0152307 A1* | 10/2002 | Doyle et al. | 709/225 |
| 2002/0165911 A1* | 11/2002 | Gabber et al. | 709/203 |
| 2002/0178259 A1* | 11/2002 | Doyle et al. | 709/225 |
| 2003/0005116 A1* | 1/2003 | Chase et al. | 709/225 |
| 2003/0014525 A1* | 1/2003 | DeLima et al. | 709/227 |
| 2003/0061278 A1* | 3/2003 | Agarwalla et al. | 709/203 |
| 2003/0065702 A1* | 4/2003 | Singh et al. | 709/105 |
| 2003/0087649 A1* | 5/2003 | Bhatia et al. | 455/456 |
| 2003/0093622 A1* | 5/2003 | Desota et al. | 711/129 |
| 2003/0097443 A1* | 5/2003 | Gillett et al. | 709/225 |
| 2003/0115420 A1* | 6/2003 | Tsirigotis et al. | 711/133 |
| 2004/0039820 A1* | 2/2004 | Colby et al. | 709/226 |
| 2004/0215709 A1* | 10/2004 | Basani et al. | 709/201 |
| 2004/0215884 A1* | 10/2004 | Lambright et al. | 711/130 |
| 2005/0010653 A1* | 1/2005 | McCanne | 709/219 |
| 2005/0193114 A1* | 9/2005 | Colby et al. | 709/226 |
| 2006/0080400 A1* | 4/2006 | Guha | 709/216 |
| 2007/0240076 A1* | 10/2007 | Astala et al. | 715/800 |

OTHER PUBLICATIONS

Akamai Technologies, Inc.—Global Internet Content Delivery—"How FreeFlow Works," webmaster@akamai.com 1999-2000.

Digital Island, Inc.—e-Business Without Limits—, "Enabling Technologies," . http://www.digisle.net. No date.

Internap, "Preferred Collocation Services," http://www.internap.com Copyright © 2001 Internap Network Services Corporation.

Meyer, et al., Request for Comments No. 2026, entitled, "Generic Routing Encapsulation (GRE)," Jan. 2000, Internet Engineering Task Force, 9 pages.

Mockapetris, P., Request for Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 Pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

* cited by examiner

MECHANISMS FOR PROVIDING DIFFERENTIATED SERVICES WITHIN A WEB CACHE

BACKGROUND OF THE INVENTION

The present invention relates to transmission of data in a network environment. More specifically, the present invention relates to methods and apparatus for improving the efficiency with which data are transmitted over the Internet. Still more specifically, the present invention provides techniques for providing differentiated services for such transmitted data.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for HTTP. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, co-pending U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes. The invention described in that co-pending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above. Currently, most Internet service providers (ISPs) accelerate access to their web sites using cache engines.

Another specific embodiment of a packet redirection protocol which may be used to implement such a network caching technique is described in co-pending, commonly assigned, U.S. patent application Ser. No. 09/608,802 for METHOD AND APPARATUS FOR REDIRECTING NETWORK TRAFFIC filed Jun. 30, 2000, the entirety of which is incorporated herein by reference for all purposes. According to a specific embodiment described in that application, the network caches have the capability of determining that particular redirected packets should be transmitted back to the redirecting router and reinserted into the original traffic flow.

This may be done in a manner transparent to the source or destination of the packets. An example of a case in which packets would need to be reinserted in the original flow might be where the cache recognizes the source and destination pairs identified by the packets as corresponding to a connection requiring IP-based authentication. Another example would be where the cache is overloaded and is currently unable to handle all of the redirected traffic.

Content providers are also experiencing a need to provide differentiated quality of service to their customers, for example, an e-commerce site may want to provide superior service to its premium customers. A web portal might want to favor paying subscribers over general surfers. A B2B (business-to-business) site may want to provide more reliable web access to its preferred business partners. Since most of these sites deploy web caches (cache engines) in reverse proxy mode in front of their server farm to offload traffic and optimize the entire web site infrastructure, providing differentiated services in cache engines would be highly desirable to enhance the quality of service experienced by the end user.

In view of the above, it would be desirable to provide a cache engine capable of providing differentiated services.

SUMMARY OF THE INVENTION

Accordingly, the present invention provides methods and apparatus for providing differentiated services with respect to data processing provided by a cache engine. In general terms, requests that are received into a cache engine are associated with a particular service level. Processing of the request by the cache engine is then based on the request's particular service level. In one implementation, processing of the request is prioritized based on the request's particular service level. In another implementation, object migration may be performed on the requested object based on the number of hits for such object by clients having the particular service level. For example, objects that are even infrequently requested by high priority clients may be stored in a low latency memory, while objects that are only very popular to low priority clients may be stored in low latency memory. In either case, objects may be moved to a high latency memory if the number of hits by a high priority client falls below a first level and the number of hits by a low priority client falls below a second level, where the second level is higher than the first level. In another aspect, when the CE does not contain the requested object, the request may be forwarded to a selected origin server, where selection of such server is based on the service level of the request.

When a response (retrieved object) is received from an origin server into the cache engine (e.g., in response to forwarding a request for such object to the origin server), processing of such response may also be based on the object request's service level, as well as a priority of the object of the response. For instance, the object's time-to-live, refreshment rate, and type of storage medium in which the object is placed within the CE may each depend on the object's priority and the original request's service level.

In one embodiment, a method for providing differentiated services within a cache system is disclosed. A first request for an object is received from a first client. At least of a portion of the first request maps to a first service level. A second request for an object is received from a second client. At least of a portion of the second request maps to a second service level. A first service type is provided when processing the first request from the first client, and the first service type is based on the first service level of the first request. A second service type is provided when processing the second request from the second client, and the second service type is based on the second service level of the second request. When the first service level differs from the second service level in a predetermined manner, the first service type differs from the second service type. For example, particular selected service levels may result in a corresponding request being processed at a higher priority than other service levels.

In a specific implementation, providing the first service type includes prioritizing the processing of the first request based on the first service level, and providing the second service type includes prioritizing the processing of the second request based on the second service level. The first request has a different priority level than the second request when the first service level differs from the second service level in a predetermined manner. In another aspect, providing the first service type includes bypassing the first request from the cache system and sending the first request to an origin server of the first request after a first predetermined time period has expired, and providing the second service type includes bypassing the second request from the cache system and sending the second request to an origin server of the second request after a second predetermined time period has expired. The first predetermined time period differs from the second predetermined time period when the first service level differs from the second service level in a predetermined manner.

In a further implementation, providing the first service type includes bypassing the first request from the cache system and sending the first request to an origin server of the first request when the cache system resources are being used at first predetermined level, and providing the second service type includes bypassing the second request from the cache system and sending the second request to an origin server of the second request when the cache system resources are being used at second predetermined level. The first determined level differs from the second predetermined level when the first service level differs from the second service level in a predetermined manner.

In another aspect, providing the first service type includes selecting a first origin server based on the first service level and fetching the object requested by the first client from the first selected origin server to the cache system when the cache system does not contain the object of the first request, and providing the second service type includes selecting a second origin server based on the second service level and fetching the object requested by the second client from the second selected origin server to the cache system when the cache system does not contain the object of the second request. The first origin server differs from the second origin server when the first service level differs from the second service level in a predetermined manner In yet another implementation, providing the first service type includes fetching the object requested by the first client from an origin server associated with the first request to a first memory of the cache system when the cache system does not contain the object of the first request, and providing the second service type includes fetching the object requested by the second client from an origin server associated with the second request to a second memory of the cache system when the cache system does not contain the object of the second request. The first memory differs from the second memory when the first service level differs from the second service level in a predetermined manner.

In a further aspect, a number of hits are tracked per object and service level for such object. It is then determined whether a number of hits for the first service level of the first object are greater than a first maximum predetermined count. The first maximum predetermined count is based on the first service level. When the number of hits for the first service level of the first object are greater than the first maximum predetermined count, the first object is migrated from a low latency memory to a high latency memory when the first object is not already contained in the high latency memory. It is also determined whether a number of hits for the second service level of the first object are greater than a second maximum predetermined count. The second maximum predetermined count is based on the second service level. When the number of hits for the second service level of the second object are greater than the second maximum predetermined count, the second object is migrated from a low latency memory to a high latency memory when the second object is not already contained in the high latency memory. The first maximum predetermined count differs from the second maximum predetermined count when the first service level differs from the second service level in a predetermined manner.

In a further aspect, when the number of hits for the first service level of the first object are less than the first maximum predetermined count, the first object is migrated from a high latency memory to a low latency memory when the first object is not already contained in the low latency memory. When the number of hits for the second service level of the second object are less than the second maximum predetermined count, the second object is migrated from a high latency memory to a low latency memory when the second object is not already contained in the low latency memory.

In another implementation, the first object is pre-fetched from an origin server prior to the first client making the first request. The first object is pre-fetched when the first object has an associated class that is higher than a predetermined service level. The second object is pre-fetched from an origin server prior to the second client making the second request. The second object is pre-fetched when the second object has an associated class that is higher than the predetermined service level.

In another embodiment, a first response having the object of the first request and a first class is requested and received from an origin server when the cache system does not contain the object of the first request. A second response having the object of the second request and a second class from the origin server is requested and received when the cache system does not contain the object of the second request. The first response is processed based on a first class of the first response, and the second response is processed based on a second class of the second response. The first processing differs from the second processing when the first class differs from the second class.

In a specific embodiment, processing the first response includes storing the object of the first response for a first predetermined time based on the second class, and processing the second response includes storing the object of the second response for a second predetermined time based on the second class. The first predetermined time differs from the second predetermined time when the first class differs from the second class in a predetermined manner. In one aspect, the first class is based on a priority of the first response and the first service level and the second class is based on a priority of the second response and the second service level. In another embodiment, processing the first response includes storing the object of the first response within a first memory based on the first class, and processing the second response includes storing the object of the second response within a second memory based on the second class. The first memory differs from the second memory when the first class differs from the second class in a predetermined manner.

In another embodiment, a first response having the object of the first request and a first class is requested and received from the origin server when the cache system does not contain the object of the first request. The object of the first response is stored within a first memory based on the first class. A second response having the object of the second request and a second class is requested and received from the origin server when the cache system does not contain the object of the second request. The object of the second response is stored within a second memory based on the second class. The first memory differs from the second memory when the first class differs from the second class in a predetermined manner.

In another embodiment, the invention pertains to a cache system operable to provide differentiated services. The cache system includes one or more processors and one or more memory. At least one of the memory and processors are adapted to provide at least some of the above described method operations. In yet a further embodiment, the invention pertains to a computer program product for providing differentiated services within a cache system. The computer program product has at least one computer readable medium and computer program instructions stored within at least one of the computer readable product configured to perform at least some of the above described method operations.

In yet another method aspect, a first request is received for an object from a first client, wherein at least of a portion of the first request is mapped to a first service level, and a second request is received for an object from a second client. At least of a portion of the second request is mapped to a second service level. The first request from the first client is prioritized based on the first service level of the first request, and the second request from the second client is prioritized based on the second service level of the second request. When the first service level differs from the second service level, the prioritizing of the first request differs from the prioritizing of the second request. When resources fall below a first predetermined level within the cache system, the first request is bypassed to an origin server. When resources fall below a second predetermined level within the cache system, the second request is bypassed to an origin server. The first predetermined level differs from the second predetermined level when the first service level differs from the second service level. When the object is not present within the cache system, the first request is forwarded to a first server. When the object is not present within the cache system, the second request is forwarded to a second server. The first server differs from the second server when the first service level differs from the second service level.

In a further aspect, When the object is present within the cache system, first object migration procedure is performed on the object based on the first service level. When the object is present within the cache system, a second object migration procedure is performed on the object based on the second service level. The first object migration procedure differs from the second object migration procedure when the first service level differs from the second service level. In yet another aspect, a first class of a first object in the first response is determined, and a second class of the second object in the second response is determined. A first time to live is set for the first object based on the first class, and a second time to live is set for the second object based on the second class. The first time to live differs from the second time to live when the first class differs from the second class. The first object is stored in a first type of memory based on the second class, and the second object is stored in a first type of memory based on the first class. The first type of memory differs from the second type of memory when the first class differs from the second class.

In another embodiment, the invention pertains to a cache system operable to provide differentiated services. The cache system includes one or more processors and one or more memory. At least one of the memory and processors are adapted to provide at least some of the above described method operations. In yet a further embodiment, the invention pertains to a computer program product for providing differentiated services within a cache system. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
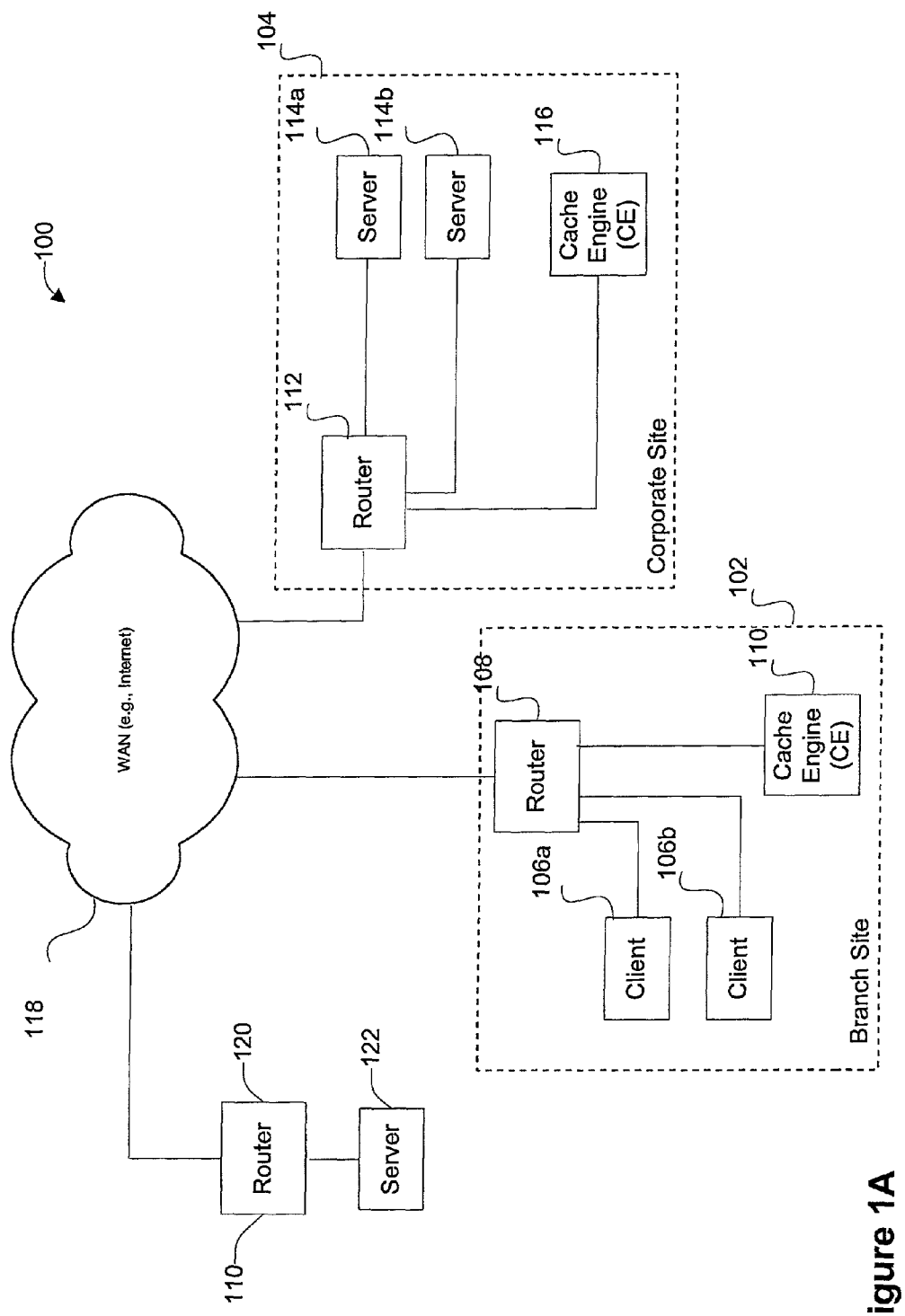
FIG. 1A is a diagrammatic representation of an Enterprise Network in which the techniques of the present invention may be implemented.

FIG. 1A is a diagrammatic representation of an Enterprise Network 100 in which the techniques of the present invention may be implemented. As shown, a branch site 102 may communicate with a corporate site 104 through wide area network (e.g., the Internet) 118. The branch site may include a plurality of clients 106, a router 108, and a cache engine (CE) 110. The corporate site may include a plurality of servers 114, CE 116, and router 112. By way of example, a client 106a of branch site 102 may wish to obtain an object from server 114a of the corporate site 104. When a client makes such a request, the request may be forwarded to the CE 110 or CE 116 by the router 108 or router 112, respectively.

Each CE may be configured to provide differentiated services based on a service level associated with the request and/or a class of the requested object. First, each CE may provide differentiated services in any step included in processing a client's request. The CE may provide different levels of service to different clients when providing a cached object, obtaining an object from an origin server that holds the requested object, and/or bypassing the client's request to an origin server. In the illustrated example, the clients 106 within the branch office may correspond to different types of employees who receive different levels of service when requesting an object from the CE 110 of the branch site 102 or the CE 116 of the corporate site 104. For instance, client 106a may be a high level manager, while client 106b is a part time employee. In one embodiment, requests by client 106a may be processed with a higher priority (e.g., are processed faster) than requests from client 106b. Several general types of differentiated services that may be provided by the techniques of the present invention are described in detail below with reference to FIGS. 2 and 3.

Figure 1B:
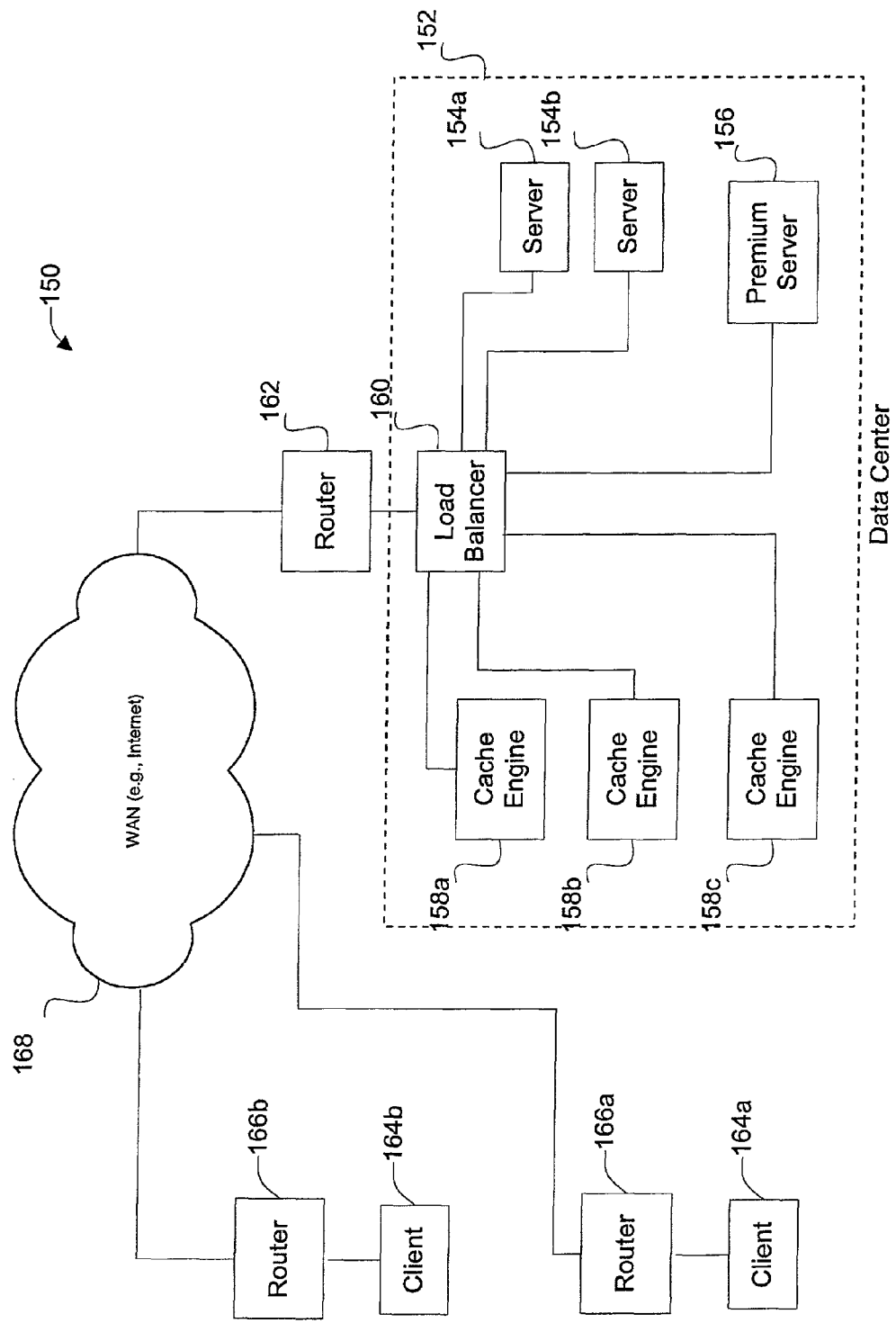
FIG. 1B illustrates a Data Center Network in which the techniques of the present invention may be implemented.

By way of another example, FIG. 1B illustrates a Data Center Network 150 in which the techniques of the present invention may also be implemented. As shown, the network 150 includes a data center 152 that is accessible by a plurality of clients (as shown, a client 164a and a client 164b). The data center includes a plurality of servers 154 for holding a plurality of objects and a plurality of cache engines (CE's) 158 for serving as proxies for objects located on any of servers 154. The data center 152 is also associated with its own router 162 for forwarding data between the data center 152 and clients 164 and a load balancer 160 for determining to which CE 158 or server 156 to forward data based on load balancing criteria.

In the illustrated embodiment, a client 164a sends a request for an object through router 166a, wide area network 168, router 162, to load balancer 160. The load balancer 160 may be configured to forward the request to a selected one of the CE 158 or servers 154. Requests for transactions may be sent to a server, while requests for other types of objects may be sent to a CE 158. Each cache engine 158 may be configured to implement the techniques of the present invention. In general terms, differentiated services are provided for processing a request for a particular object sent to a particular CE 158. For example, particular clients may be given a higher level of service. In some cases, one of the servers may be a premium server (e.g., super fast), and each CE 158 may be configured to forward and/or bypass a request from a premium client (e.g., a higher paying customer) to such premium server. Accordingly, the premium client is provided with faster service. Alternatively, data objects that are frequently used by premium clients may be permanently stored (or stored for a relatively long time) within the CE and not deleted after expiration of a predetermined time period, as is done on conventional CE's. In another example, premium objects may be stored within low latency memory, rather than high latency memory, (or migrated less frequently from low to high latency memory) on each CE. Other example applications of the present invention are described further below with reference to FIGS. 2 and 3.

Figure 2:
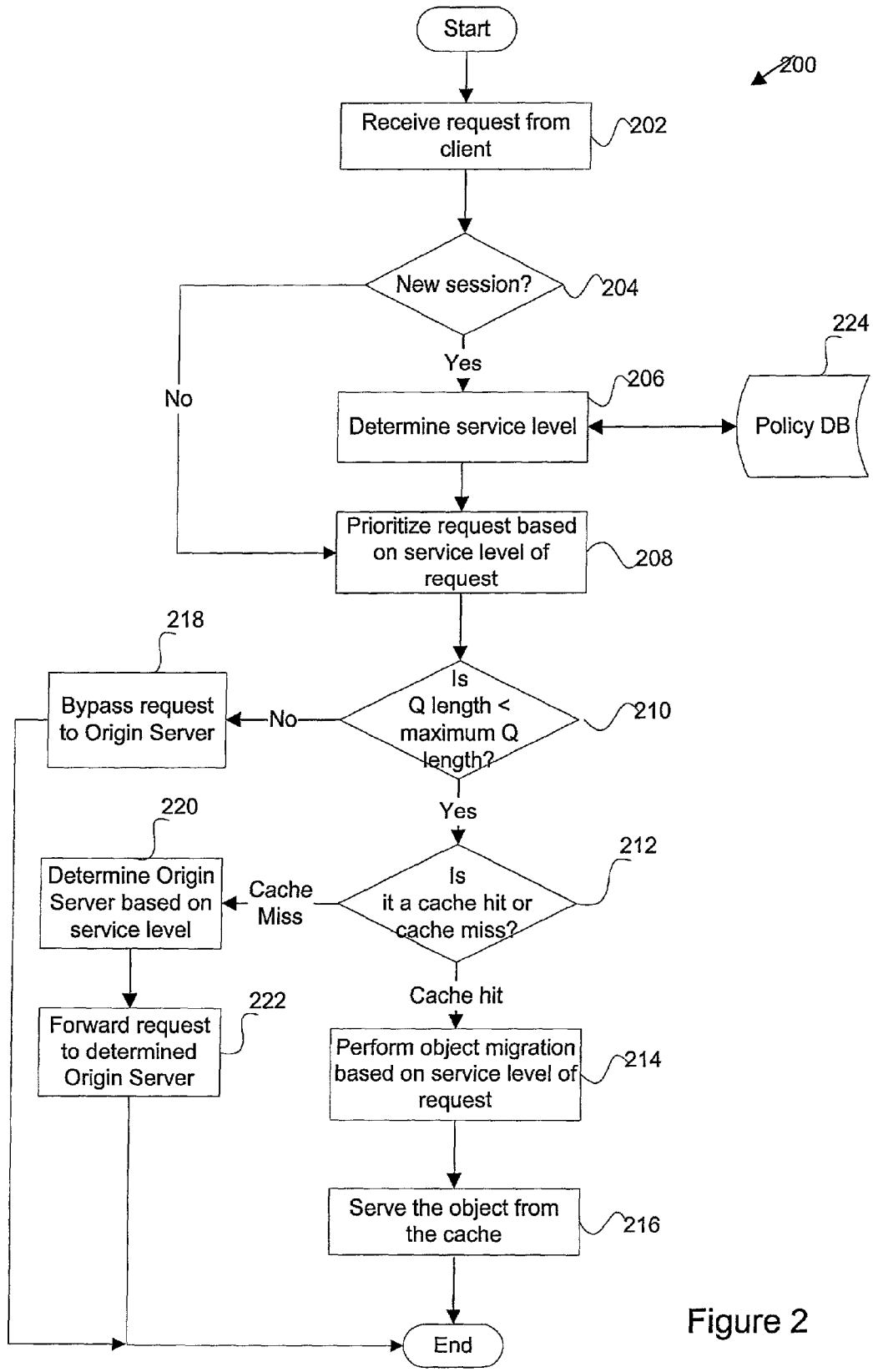
FIG. 2 is a flowchart illustrating a procedure for handling a request from a client that is received into a cache engine (CE) in accordance with one embodiment of the present invention.

FIG. 2 is a flowchart illustrating a procedure 200 for handling a request from a client that is received into a cache engine (CE) in accordance with one embodiment of the present invention. Initially, a request for an object is received in the CE from a client in operation 202. The request can be initiated by any suitable entity for any type of object. In the Enterprise System 100 of FIG. 1A, a client 106 of a branch site 102 may request an object from a server 114 from corporate site 104. However, the request goes to the router 108 associated with the branch site 102, and the router 108 forwards the request to a CE associated with the branch site 102. In the Data Center 150 of FIG. 1B, a client 164 may request an object from a server 154 of Data Center 150. The router 162 that is associated with the Data Center 150 receives the request and forwards the request to one of the CE's 158 via the load balancer 160. The requested object may be, by way of examples, a static file, such as a graphics or text file, an interactive executable file, or a streaming file, such as a video clip, Quick time file, etc.

It is then determined whether this request represents a new session in operation 204. This determination depends on the type of request. For example, a new session can be defined as a start of a single HTTP persistent connection (in which multiple HTTP requests are sent over the same TCP connection). In another example, a new session can be defined as one complete transaction, which might involve multiple web requests. In a final example, a new session can be defined as one login session or the complete set of web requests that are made in one login session, e.g., to a particular service provider's server. If this is a new session, a service level is then determined for the request in operation 206. If this is not a new session, operation 206 is skipped because the service level has previously been determined for this session.

In general terms, a service level indicates the types of service that will be used to process a corresponding type of request. In one implementations, the service levels are each a number selected from a range between 1 and 10. The service level value may correspond to different levels of priority or a different kind of service. For example, a service level of 1 may indicate a superior level of services, while a service level of 10 indicates an inferior level of services. In another example, a service level of 1 indicates that the request is to be processed by a first set of techniques, while a service level of 2 indicates that the request is to be processed by a second set of techniques. A request may be mapped to a specific service level based on any characteristic of the request. A characteristic may includes one or more field values of the request, such as user identification (e.g., from the Authorization HTTP header), the client source address, port or domain name, a cookie, or a destination address, port, or domain. A particular service level may be mapped to one or more specific field characteristics. For instance, a first service level may be mapped to a list of specific source addresses, and a second service level may be mapped to another list of specific source addresses. In a specific example, a client's buying patterns or service subscription level may be correlated with a particular service level. Each request may be mapped to a service level in any suitable manner. In one implementation, each service level is mapped to one or more request characteristics within a database system that is accessible by any suitable access protocol, such as a LDAP (Lightweight Directory Access Protocol) Policy Server 224.

Any number and type of differentiated service(s) may then be implemented while processing the request. FIG. 2 illustrates several processing operations that depend on the request's determined service level. However, implementation of the present invention does not require all of these processing operations to be based on service level. That is, one or more of the following processing operations may be based on the request's service level. In one embodiment, the requests may be prioritized based on the service level of the request. That is, requests having certain service levels are processed quicker than requests having other service levels. Additionally or alternatively, the CE may reserve a designated amount of its resources for high priority clients or customers. Also, if the CE needs to drop requests due to resource overload, the CE drops the lower priority requests before the higher priority requests.

In one implementation of differentiated prioritization, the request is prioritized based on its service level in operation 208. For instance, the CE maintains different priority FIFO queues into which different requests are received based on their service level. In a simple case, a first queue has a higher priority then a second queue. Requests having a first service level go into the first queue, while requests having a second service level go into the second queue. Requests from the first queue are processed before requests in the second queue.

Each queue may also have a different associated maximum queue length that is used to determine whether to bypass the request to the origin server. For instance, a high priority queue may have a relatively short maximum queue length. In the illustrated embodiment, it may then be determined whether the request's associated queue length is greater than its associated maximum queue length in operation 210. If the queue length is not less than the maximum queue length (i.e., the queue is full), the request is bypassed to the origin server in operation 218. The procedure 200 then ends.

A predetermined maximum period may also alternatively be associated with each request based on its service level. Shorter time periods may be associated with higher priority service levels. If a particular requests remains in its queue for more than its associated predetermined time period, the request is bypassed to its origin server. In a more general example, requests may be bypassed when CE resources are at a level that depends on the request's service level. In one specific case, when the CE's resources are being used above a first predetermined level, requests having a first service level are bypassed to the origin server. When the CE's resources are being used above a second predetermined level, requests having a second service level are bypassed to the origin server Returning to FIG. 2, if the queue length is less than the maximum queue length (i.e., the queue is not full), it is then determined whether this is a cache hit or cache miss in operation 212. In other words, it is determined whether the requested object is present within the cache (i.e., a cache hit).

If this is a cache hit, an object migration may be performed based on the service level of the request in operation 214. This object migration operation may also be performed after the object is served. Object migration generally includes determining whether to move the requested object based on the number of hits for such object and the determined service level. One embodiment for performing object migration is described below with respect to FIG. 3. After object migration, the object may then be served from the cache in operation 216. The procedure 400 for handling the request then ends.

If this is a cache miss, the origin server may then be determined based on the service level in operation 220. That is, a specific origin server from which the object may be fetched may be mapped to the request's particular service level. For example, a premium server may be used to retrieve an object for a high priority client. A premium server may be determined by simply polling a plurality of possible servers and selecting the least busy server for retrieval of the requested object. Alternatively, the CE may be configured with information specifying which origin servers are premium servers. The requests may then be forwarded to the determined origin server (and the object is also retrieved for a next request for such object) in operation 222. In a further implementation, requests that are bypassed because their associated queue is too full (e.g., in operations 210) may also be bypassed to a selected origin server. The procedure 400 then ends.

Figure 3:
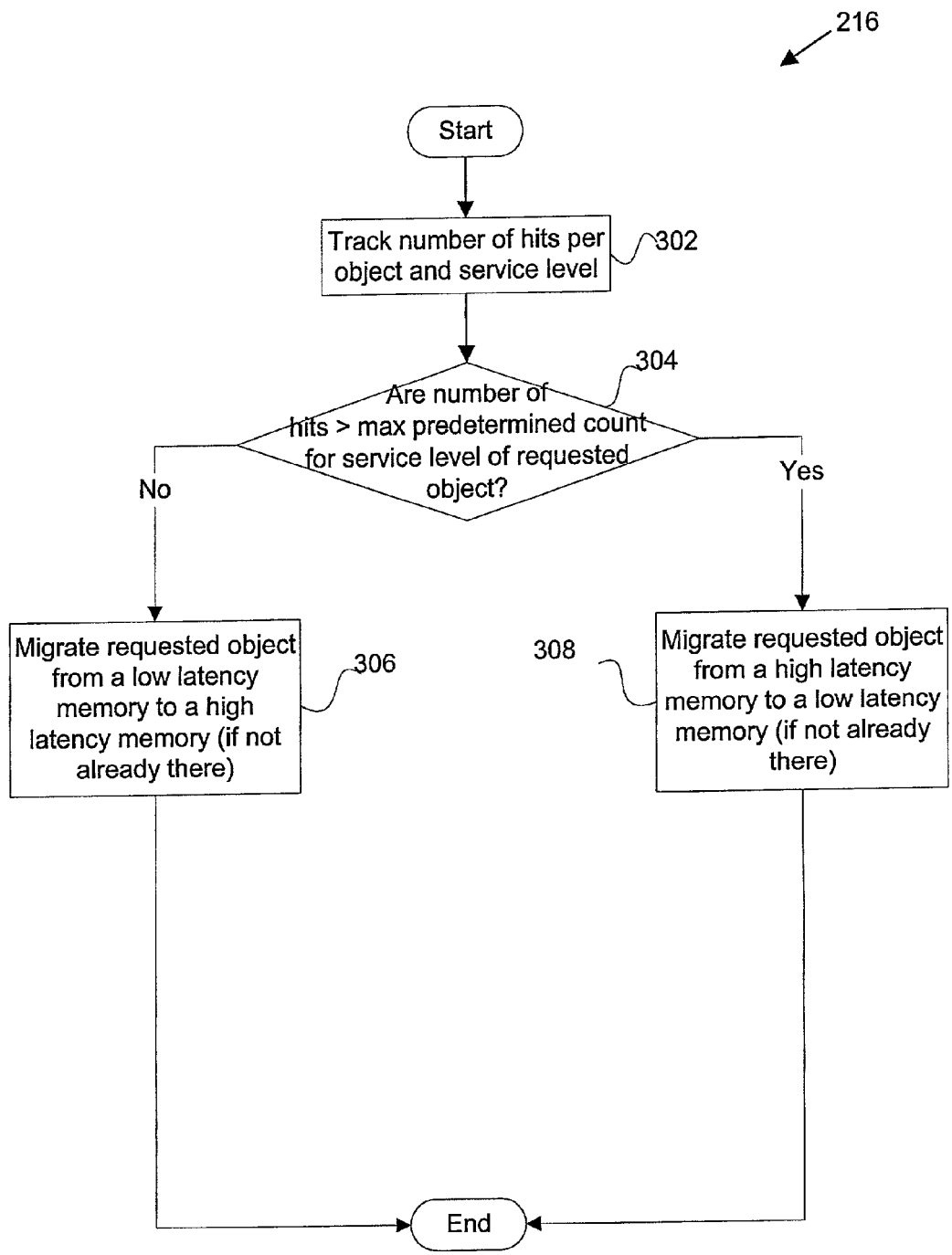
FIG. 3 is a flowchart illustrating the operation of FIG. 2 for performing object migration in accordance with one embodiment of the present invention

FIG. 3 is a flowchart illustrating the operation 216 of FIG. 2 for performing object migration in accordance with one embodiment of the present invention. Initially, the number of hits per object and service level are tracked in operation 302. That is, a counter associated with a particular service level and object is incremented for the current received request. It is then determined whether the number of hits are greater than the maximum predetermined count for the determined service level of the requested object in operation 304. If the number of hits are not greater than the maximum predetermined count for the service level of the requested object, the requested object may be migrated from a low latency memory to a high latency memory (if not already there) in operation 306. For example, an object may be moved from RAM to the hard disk of the CE. The procedure then ends. If the number of hits are greater than the maximum predetermined count, the requested object is then migrated from a high latency memory to a low latency memory (if not already there) in operation 308. The procedure then ends. Object migration may also include a hysteresis type algorithm. That is, objects are moved from a high to low latency memory when the number of hits for such object exceed a first number for a particular service level, but moved from a low to high latency memory when the hits fall below a second number for a particular service level, where the first number is higher than the second number.

The maximum predetermined counts for each object and service type may be set such that objects used by high priority clients are more likely to be stored in low latency memory. Thus, a low maximum count may be used for high priority service levels. Higher counts may be used for lower priority service levels. Thus, only very popular objects served to low priority clients will move to high-speed file systems. File migration may greatly facilitate conservation of valuable memory resources.

Figure 4:
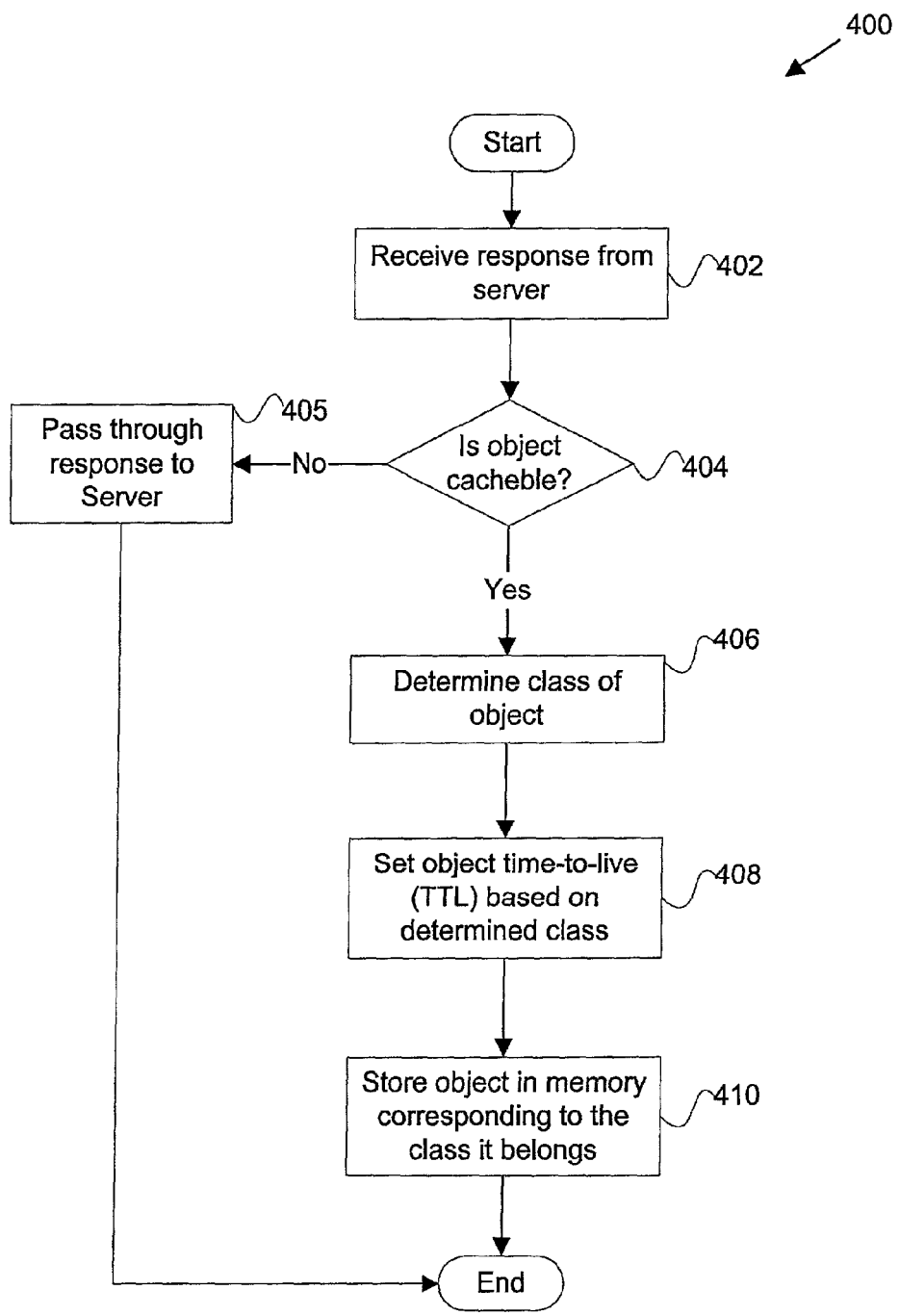
FIG. 4 is a flowchart illustrating a procedure for providing differentiated services for a response received from a server within a cache engine (e.g., in response to an object request) in accordance with one embodiment of the present invention.

FIG. 4 is a flowchart illustrating a procedure 400 for providing differentiated services for a response received from a server within a cache engine (e.g., in response to an object request) in accordance with one embodiment of the present invention. Initially, a response is received from a server in operation 402. For example, the CE has sent a request for an object to an origin server because the CE does not have the object cached. It is first determined whether the object is cacheable in operation 404. This determination may, for example, be based on the type of the object. Static objects may be determined to be cacheable, while dynamic objects are not. The origin server may also mark particular objects as cacheable or non-cacheable. If the object is not cacheable, the response is passed through to the server in operation 405 and the procedure 400 ends.

If the object is cacheable, the class of the object is then determined in operation 406. The class may be determined in any suitable manner and may be a function of the response from the server and/or the determined service level of the request for the object. In one implementation, the origin server may indicate an object's priority in its response (e.g., ToS bits or 802.1p priority field). Alternatively, the server may indicate the object's priority by adding an additional Cache-Control HTTP Response Header field. A class may then be mapped to the response's priority and the service level of the request for such object.

Processing the response may then be based on the determined class of the object. In one embodiment, an object timed to live (TTL) may then be set based on the determined class in operation 408. For example, premium objects which are used by premium clients may be cached for a longer time (or even forever) than lower priority objects. Additionally, object refreshment algorithms may be based on the class of the object. Premium objects which frequently become stale, such as stock data, may be frequently refreshed to maintain their validity. The object may also be stored in memory corresponding to the class it belongs in operation 410. An response's class may also be determinative as to whether the object is to be stored in a low or high latency memory. In the example of FIG. 1A, premium clients from the branch site may have ready access to an important company report stored in the memory of a CE at its branch site. The procedure 400 then ends.

The CE may also be configured to pre-fetch high priority objects from an origin server. A financial trading system may provide its premium customers with quick access to premium objects, such as market research reports. These premium objects may be pre-fetched from the origin servers associated with the trading system. In contrast, lower priority objects are fetched on demand by the clients. Higher priority objects may also be refreshed more frequently than lower priority objects so that the objects are less likely to become stale.

Generally, the techniques for providing differentiated services of the present invention may be implemented on software and/or hardware. For example, the techniques can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

Figure 5:
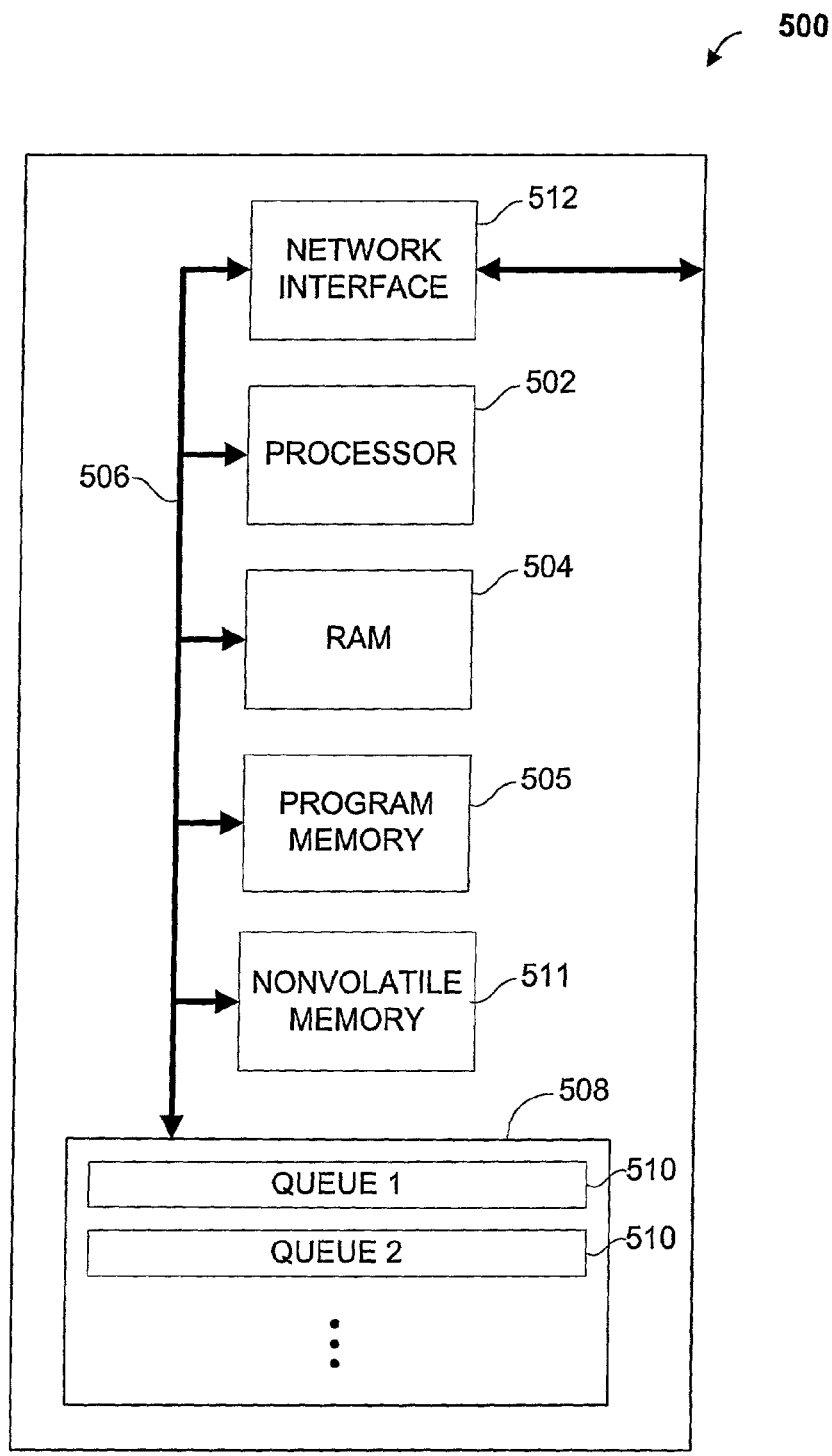
FIG. 5 is a block diagram of a cache engine (CE) such as, for example, one of the CE's of FIG. 1A or one of CE's of FIG. 1B.

FIG. 5 is a block diagram of a cache engine (CE) such as, for example, CE 110 or 116 of FIG. 1A or one of CE 158 of FIG. 1B. A central processor 502 controls operation of CE 500 and its various subsystems using system memory 504 and bus 506. Data objects are stored in cache memory 508 which, in a specific embodiment, comprises multiple queues of volatile RAM 510. According to various embodiments, memory 508 may comprise one or more nonvolatile disk drives. According to yet other embodiments, memory 508 may comprise any combination of volatile and nonvolatile memory. According to a specific embodiment, a nonvolatile disk drive 511 is provided as additional storage for cached objects.

A network interface 512 enables communication with external devices. Portions of memory 510 may also be employed for other purposes such as, for example, storing software code for directing the operation of various techniques of CE 500. Alternatively, program instructions for execution by processor 502 directing operation of the techniques of CE 500 may be stored in a separate program memory 505. It will be understood that the cache architecture shown in FIG. 5 is merely illustrative and should not be construed to limit the scope of the present invention. That is, any of a wide variety of CE architectures may be employed to implement the present invention.

Regardless of the cache engine's configuration, it may employ one or more memories or memory modules (such as, for example, memory 504, 505, and 511) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, service levels for such flows, class information for each retrieved object, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, the techniques of the present invention may be easily modified to forward requests to selected CE's based on service level and/or the class of the retrieved object. In one implementation, premium clients could use a high speed CE, as opposed to a slower CE. Therefore, the described embodiments should be taken as illustrative and not restrictive, and the invention should not be limited to the details given herein but should be defined by the following claims and their full scope of equivalents.

What is claimed is:

1. A method for providing differentiated services within a cache system, the method comprising:
   at the cache system, receiving from a first client a first request for a first object,
   at the cache system, determining a first service level based on a portion of the first request, wherein the determined first service level specifies whether to fetch the first object from a premium server or from a non-premium server so as to cache such fetched first object to the cache system;
   at the cache system, determining from which of the premium server or the non-premium server to fetch the first object to the cache system based on the determined first service level; and
   fetching the first object from the determined premium server or non-premium server and caching such fetched first object at the cache system.

2. A cache system operable to providing differentiated services, the cache system comprising:
   one or more processors;
   one or more memory, wherein at least one of the processors and memory are adapted to:
   receive from a first client a first request for a first object,
   determine a first service level based on a portion of the first request, wherein the determined first service level specifies whether to fetch the first object from a premium server or from a non-premium server so as to cache such fetched first object to the cache system;
   determine from which of the premium server or the non-premium server to fetch the first object to the cache system based on the determined first service level; and
   fetch the first object from the determined premium server or non-premium server and cache such fetched first object at the cache system.

3. An apparatus for providing differentiated services within a cache system, the apparatus comprising:
   means for receiving from a first client a first request for a first object;
   means for determining at the cache system a first service level based on a portion of the first request, wherein the determined first service level specifies whether to fetch the first object from a premium server or from a non-premium server so as to cache such fetched first object to the cache system;
   means for determining from which of the premium server or the non-premium server to fetch the first object to the cache system based on the determined first service level; and
   means for fetching the first object from the determined premium server or non-premium server and caching such fetched first object at the cache system.

4. A method as recited in claim 1, further comprising:
   caching the first object in either a low latency memory or a high latency memory of the cache system based on the determined first service level.

5. A method as recited in claim 4, wherein the determined first service level specifies a first maximum predetermined count for moving the first object between the high latency memory and the low latency memory whereby the first predetermined count is selected from a plurality of maximum predetermined counts, the method further comprising:
   tracking a number of hits for the first object; and
   when the number of hits for the first object is greater than the first maximum predetermined count, migrating the first object from the low latency memory to the high latency memory when the first object is not already contained in the high latency memory.

6. A method as recited in claim 5, further comprising:
   when the number of hits for the first object is less than the first maximum predetermined count, migrating the first object from the high latency memory to the low latency memory when the first object is not already contained in the low latency memory.

7. A method as recited in claim 1, further comprising:
   determining a first class of the first object;
   setting a first time to live for the first object based on the first class; and
   caching the first object in a first type of memory based on the first class.

8. A method as recited in claim 1, wherein the first service level is determined from a client source address, port, or identifier.

9. A method as recited in claim 1, wherein the first service level is determined from a user identifier.

10. A method as recited in claim 1, wherein the first service level is determined from a cookie.

11. A method as recited in claim 1, wherein the first service level is determined from a destination address, port, or identifier.

12. A method as recited in claim 1, wherein the first service level is determined from a user subscription level.

13. A cache system as recited in claim 2, wherein the at least one of the processors and memory are further adapted to:
   cache the first object in either a low latency memory or a high latency memory of the cache system based on the determined first service level.

14. A cache system as recited in claim 13, wherein the determined first service level specifies a first maximum predetermined count for moving the first object between the high latency memory and the low latency memory whereby the first predetermined count is selected from a plurality of maximum predetermined counts, wherein the at least one of the processors and memory are further adapted to:
   track a number of hits for the first object; and
   when the number of hits for the first object is greater than the first maximum predetermined count, migrate the first object from the low latency memory to the high latency memory when the first object is not already contained in the high latency memory.

15. A cache system as recited in claim 14, wherein the at least one of the processors and memory are further adapted to:
   when the number of hits for the first object is less than the first maximum predetermined count, migrate the first object from the high latency memory to the low latency memory when the first object is not already contained in the low latency memory.

16. A cache system as recited in claim 2, wherein the at least one of the processors and memory are further adapted to:
   determine a first class of the first object;
   set a first time to live for the first object based on the first class; and
   cache the first object in a first type of memory based on the first class.

17. A cache system as recited in claim 2, wherein the first service level is determined from a client source address, port, or identifier.

18. A cache system as recited in claim 2, wherein the first service level is determined from a user identifier.

19. A cache system as recited in claim 2, wherein the first service level is determined from a cookie.

20. A cache system as recited in claim 2, wherein the first service level is determined from a destination address, port, or identifier.

21. A cache system as recited in claim 2, wherein the first service level is determined from a user subscription level.

* * * * *